United States Patent [19]

Tesch

[11] 3,947,729

[45] Mar. 30, 1976

[54] SURGE PROTECTOR TERMINAL ASSEMBLY

[75] Inventor: Charles L. Tesch, Bensenville, Ill.

[73] Assignee: Methode Electronics, Inc., Chicago, Ill.

[22] Filed: Jan. 16, 1975

[21] Appl. No.: 541,644

[52] U.S. Cl. .................. 317/61.5; 317/62; 317/99; 337/34

[51] Int. Cl.[2] .......................................... H02H 9/06

[58] Field of Search .......... 317/61.5, 62, 69, 61, 99, 317/120; 339/111, 75 A, 192 R; 315/229, 301; 313/DIG. 5; 337/32, 33, 34; 174/51

[56] References Cited

UNITED STATES PATENTS

| | | | |
|---|---|---|---|
| 3,345,542 | 10/1967 | Paddock et al. | 337/32 X |
| 3,535,779 | 10/1970 | Wanaselja | 337/32 X |
| 3,851,220 | 11/1974 | Charles | 317/61.5 |
| 3,901,576 | 8/1975 | Berman | 337/34 X |

*Primary Examiner*—James D. Trammell

*Attorney, Agent, or Firm*—Charles F. Pigott, Jr.

[57] ABSTRACT

A terminal block carries a plurality of terminals, a plurality of end clips connected to certain of the terminals, and a pair of ground clips. The terminal block is provided with cavities for receiving surge-protector gas tubes which are engaged by the end clips and ground clips.

5 Claims, 8 Drawing Figures

SURGE PROTECTOR TERMINAL ASSEMBLY

BACKGROUND OF THE INVENTION

Various electrical circuits, including for example telephone circuits, require protection against surges of current caused by lightning and the like. To afford such protection, surge-protector gas tubes commonly have been associated with electrical connector units. Heretofore, the gas tubes have been mounted separately from the connector units, and have been coupled with the connector units by wires. These arrangements have been bulky and inconvenient and expensive to install and maintain.

SUMMARY OF THE IVENTION

It is a primary object of the present invention to provide a unitary connector unit and surge protector which is compact and inexpensive to fabricate and maintain.

This object is accomplished by providing a single terminal block, formed with suitable cavities, recesses and the like, in which are mounted a group of side-by-side lengthwise-spaced-apart terminals, a plurality of end clips connected to certain of the terminals, and a pair of elongated ground clips on opposite sides of the group of terminals. The end clips and ground clips are adapted to engage surge-protector gas tubes removably received within the terminal block on opposite sides of the group of terminals.

DESCRIPTION OF THE PREFERRED EMBODIMENT

Figure 1:
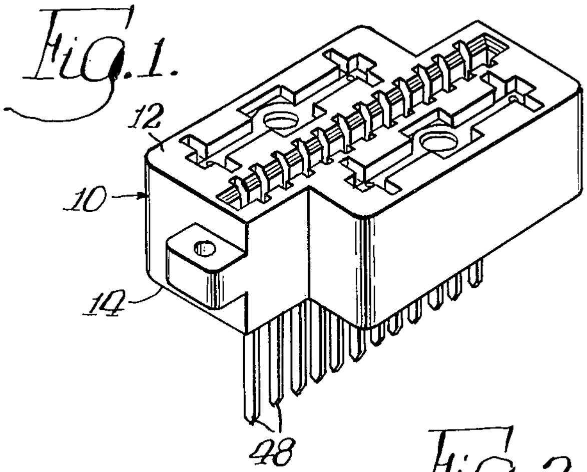
FIG. 1 is a perspective view of a surge-protector gas tube terminal assembly embodying the principles of the present invention.

As shown for example in FIG. 1, the gas tube terminal assembly of the present invention comprises an insulative terminal block 10 which may be fabricated of a glass-filled polyestor material or other suitable insulative material and which presents parallel outer and inner faces 12 and 14.

Figure 2:
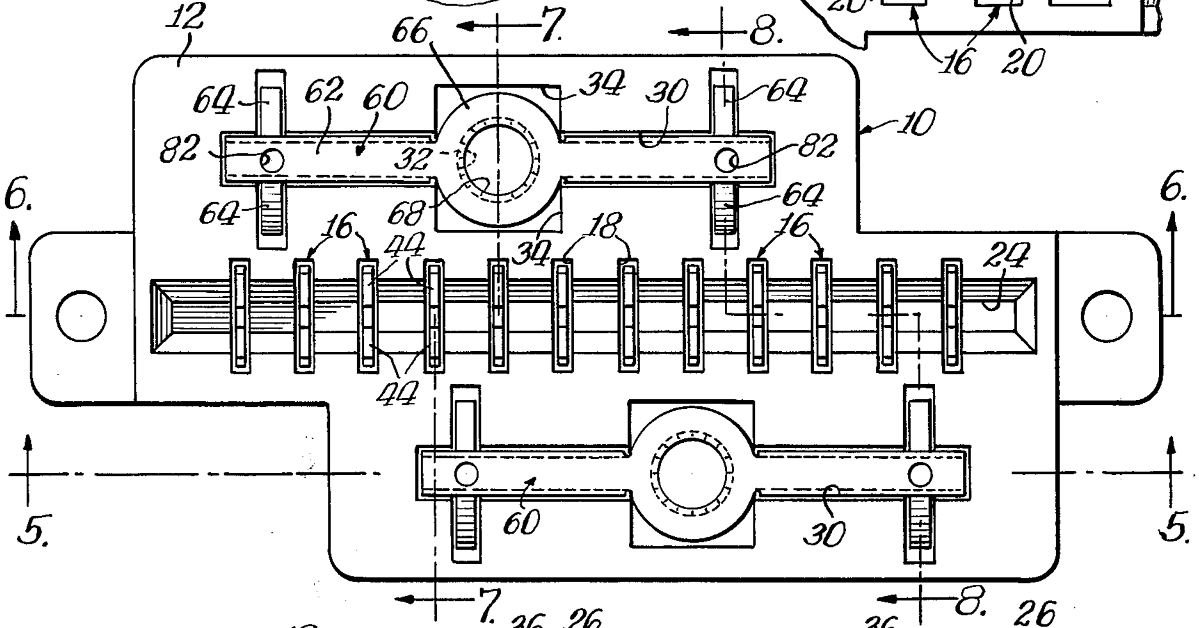
FIG. 2 is a plan view, on an enlarged scale, of the assembly of FIG. 1.
Figure 5:
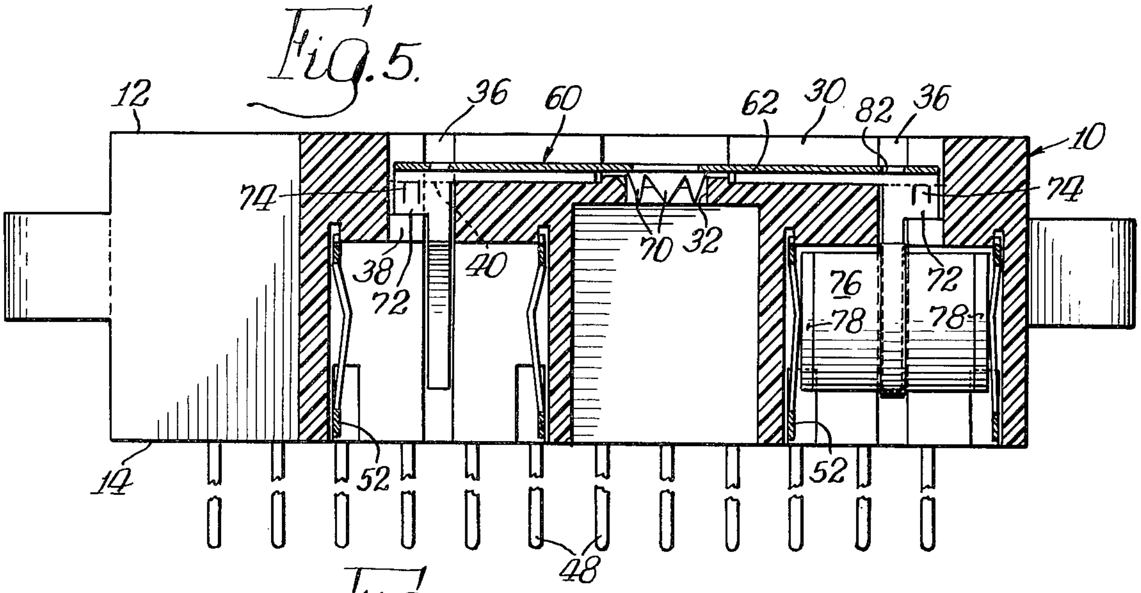
FIG. 5 is a sectional view taken substantially along the line 5—5 in FIG. 2 looking in the direction indicated by the arrows.
Figure 6:
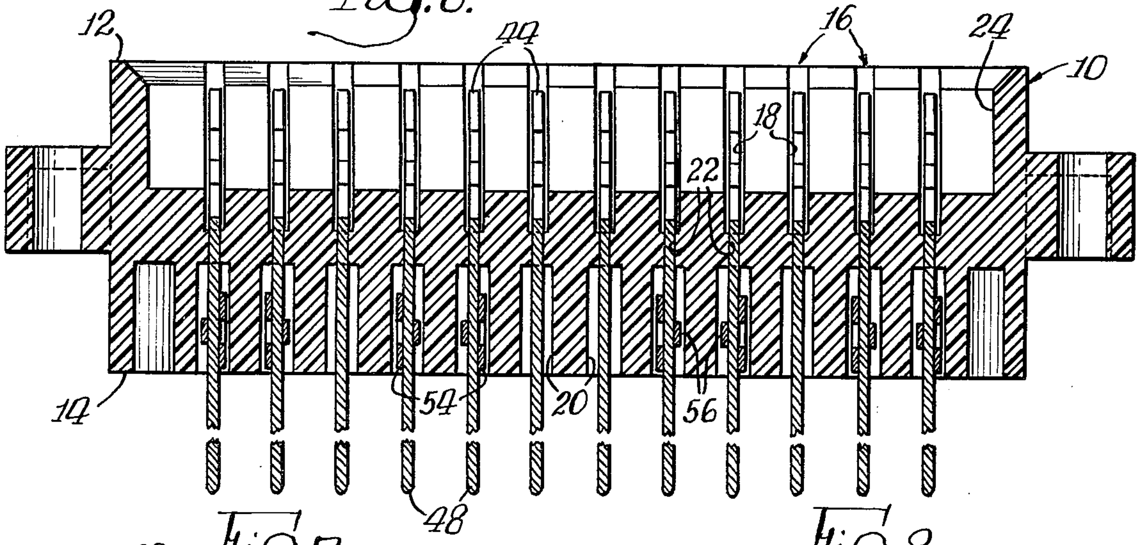
FIG. 6 is a sectional view taken substantially along the line 6—6 in FIG. 2 looking in the direction indicated by the arrows.

The terminal block 10 is formed with a group of side-by-side lengthwise-spaced-apart terminal apertures 16 (FIGS. 2, 6 and 7) extending transversely of the outer and inner faces 12 and 14. Each aperture 16 presents an outer portion 18, an inner portion 20, and an intermediate portion 22. Intersecting the outer portions 18 of the terminal apertures 16 is a lengthwise channel 24. The terminal block 10 is also formed with a set or pair of gas tube cavities 26 (FIGS. 3, 4, 5, 7 and 8) on each side of the group of terminal apertures 16. The gas tube cavities 26 are open at the inner face 14, and the cavities 26 of one set are staggered or offset lengthwise in relation to the cavities 26 of the other set. The terminal block 10 is further formed with a plurality of slots 28 (FIGS. 3 and 4) which are open at the inner face 14 and which extend between the ends of the gas tube cavities 26 and the inner portions 20 of certain of the terminal apertures 16. The terminal block 10 is additionally formed with an elongated ground clip recess 30 (FIGS. 2 and 5) on each side of the group of terminal apertures 16. Finally, the terminal block 10 (FIGS. 2, 5, 7 and 8) is formed with a bore 32 and side notches 34 centrally of each ground clip recess 30, and with a plurality of openings 36 which extend between the ends of the ground clip recesses 30 and the intermediate portions of the gas tube cavities 26. The ground clip recesses 30 and the openings 36 are open at the outer face 12. Each opening 36 includes a side cutout 38 defining interior shoulders 40.

Figure 7:
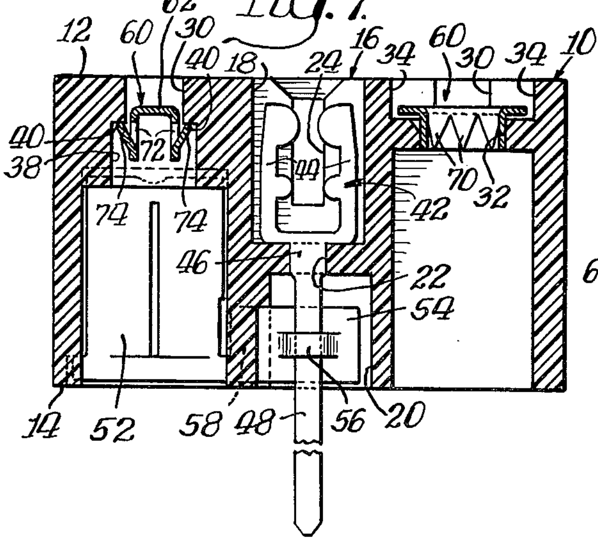
FIG. 7 is a sectional view taken substantially along the line 7—7 in FIG. 2 looking in the direction indicated by the arrows.

Disposed in each terminal aperture 16, as shown in FIG. 7, is a tuning-fork-shaped terminal 42 which may be fabricated of a tin-brass alloy or other suitable conductive material. The terminal 42 comprises arm portions 44 lying within the outer terminal aperture portion 18, a body portion 46 staked or otherwise secured in the intermediate terminal aperture portion 22, and a leg portion 48 extending through and outwardly of the inner terminal aperture portion 20. The arm portions 44 and leg portion 48 of the terminals 42 are adapted to be releasably connected to conventional circuit boards or other circuitry (not shown).

Figure 4:
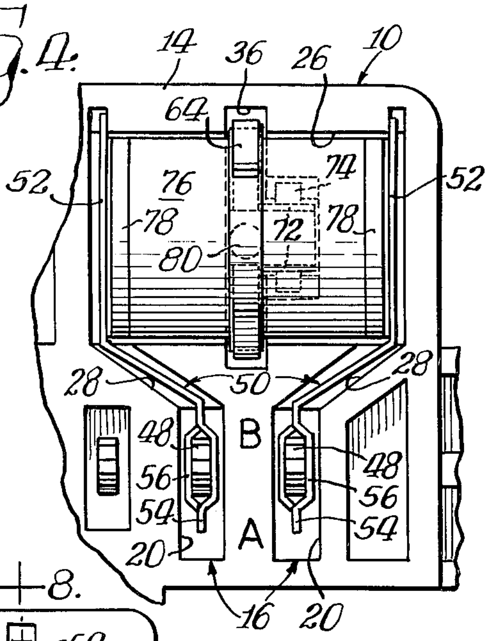
FIG. 4 is a further enlarged partial underside view of the assembly.
Figure 3:
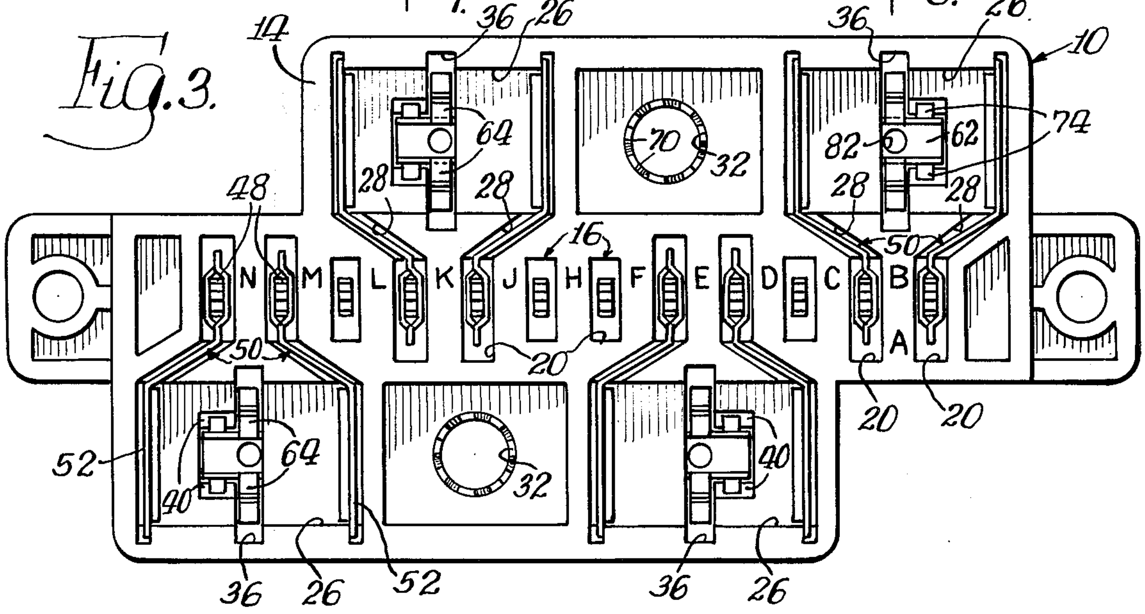
FIG. 3 is an underside view, on an enlarged scale, of the assembly of FIG. 1.

Extending between the ends of the gas tube cavities 26 and the leg portions 48 of certain of the terminals 42, as shown in FIGS. 3, 4 and 7, are a plurality of right- and left-hand gas tube end clips 50 which may be fabricated of a spring temper phosphorus-bronze alloy or other suitable spring-like conductive material. Each clip 50 comprises a contact portion 52 disposed at one end of one of the gas tube cavities 26, an anchor portion 54 disposed in the inner portion 20 of the terminal apertures 16 and connected by a struck-out eyelet portion 56 to the leg portion 48 of the adjacent one of the terminals 42, and a web portion 58 disposed in the associated one of the slots 28 and interconnecting the contact portion 52 and the anchor portion 54.

Disposed in each ground clip recess 30, as shown in FIGS. 2, 5, 7 and 8, is a gas tube ground clip 60 which may be fabricated of a spring temper phosphorus-bronze alloy or other suitable spring-like conductive material. Each ground clip 60 comprises an elongated body portion 62 lying in one of the recesses 30, and arcuate spring arms 64 at the opposite ends of the body portion 62 and projecting through the terminal block openings 36 into the adjacent one of the gas tube cavities 36. The body portion 62 has an enlarged central section 66 and a central hole 68 formed with depending teeth 70 that frictionally engage the terminal block bore 32 and serve to receive a ground connection lug (not shown). The body portion 62 also has end flanges 72 formed with ears 74 that are snapped through the recess 30 and engage the interior shoulders 40 of the terminal block side cutouts 38.

Figure 8:
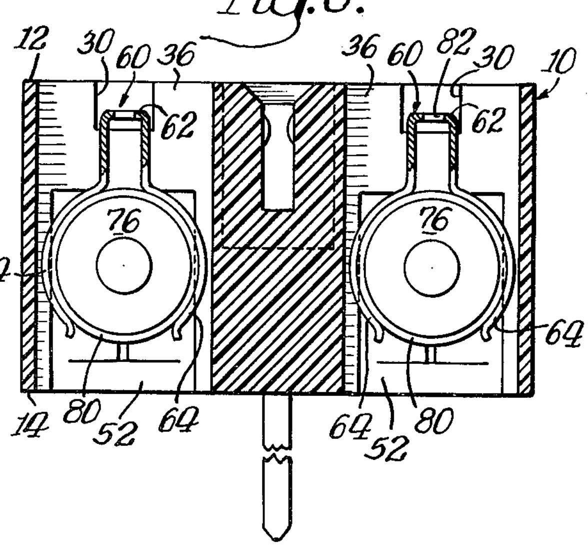
FIG. 8 is a sectional view taken substantially along the line 8—8 in FIG. 2 looking in the direction indicated by the arrows.

Disposed in each of the gas tube cavities 26 is a conventional surge-protector gas tube 76 having end disc terminals 78 and an intermediate disc terminal 80 (FIGS. 4 and 8). The end terminals 78 are frictionally engaged or gripped by the contact portions 52 of the adjacent gas tube end clips 50, while the intermediate terminal 80 is frictionally engaged or gripped by the adjacent spring arms 64 of the associated gas tube ground clip 60. Operationally, the gas tubes 76 serve to divert abnormal surges of current through the intermediate terminals 80 and ground clip 60 to ground, and thereby prevent such surges of current from passing between the terminals 42 having connection with the end terminals 78. The body portions 62 of the ground clips 60 are formed with apertures 82 (FIG. 2) through which a rod (not shown) may be pushed to dislodge a spent gas tube 76 for replacement.

While there has been shown and described a preferred embodiment of the present invention, it will be understood by those skilled in the art that various rearrangements and modifications may be made therein without departing from the spirit and scope of the invention.

The invention claimed is:

1. A surge-protector gas tube terminal assembly comprising: an insulative terminal block presenting parallel outer and inner faces and being formed with a group of side-by-side lengthwise-spaced-apart terminal apertures extending transversely of said outer and inner faces, a set of gas tube cavities on each side of said group of terminal apertures, a plurality of slots extending between the ends of said gas tube cavities and certain of said terminal apertures, an elongated ground clip recess on each side of said group of terminal apertures, and a plurality of openings extending between the ends of said ground clip recesses and the intermediate portions of said gas tube cavities; a plurality of terminals disposed in said terminal apertures; a plurality of gas tube end clips each having a contact portion disposed at one end of one of said gas tube cavities, an anchor portion disposed in one of said terminal apertures and connected to the adjacent one of said terminals, and a web portion disposed within the associated one of said slots and interconnecting said contact portion and said anchor portion; a pair of gas tube ground clips each having a body portion disposed in one of said ground clip recesses, and spring arms projecting through said openings into the adjacent ones of said gas tube cavities; and said contact portions in each of said gas tube cavities being adapted to grip the end terminals of a surge-protector gas tube, and said spring arms in each of said gas tube cavities being adapted to grip the intermediate terminal of a surge-protector gas tube.

2. A surge-protector gas tube terminal assembly comprising: an insulative terminal block presenting parallel outer and inner faces and being formed with a group of side-by-side lengthwise-spaced-apart terminal apertures extending transversely of said outer and inner faces with each of said apertures presenting an outer portion and an inner portion and an intermediate portion, a set of gas tube cavities on each side of said group of terminal apertures and open at said inner face, a plurality of slots open at said inner face and extending between the ends of said gas tube cavities and the inner portions of certain of said terminal apertures, an elongated ground clip recess on each side of said group of terminal apertures and open at said outer face, and a plurality of openings open at said outer face and extending between the ends of said ground clip recesses and the intermediate portions of said gas tube cavities; a plurality of terminals disposed in said terminal apertures and each including arm portions lying within said outer terminal aperture portion, a body portion secured in said intermediate terminal aperture portion, and a leg portion extending through said inner terminal aperture portion; a plurality of gas tube end clips each having a contact portion disposed at one end of one of said gas tube cavities, an anchor portion disposed in an inner portion of one of said terminal apertures and connected to the leg portion of the adjacent one of said terminals, and a web portion disposed within the associated one of said slots and interconnecting said contact portion and said anchor portion; a pair of gas tube ground clips each having a body portion disposed in one of said ground clip recesses, and spring arms projecting through said openings into the adjacent ones of said gas tube cavities; and said contact portions in each of said gas tube cavities being adapted to grip the end terminals of a surge-protector gas tube, and said spring arms in each of said gas tube cavities being adapted to grip the intermediate terminal of a surge-protector gas tube.

3. The gas tube terminal assembly of claim 2 wherein said openings include interior shoulders, said terminal block is formed with a bore centrally of each ground clip recess, and each of said gas tube ground clips includes a hole with depending teeth that frictionally engage the adjacent of said terminal block bores and are adapted to receive a ground connection lug and includes end flanges with ears that engage the adjacent of said interior shoulders.

4. The gas tube terminal assembly of claim 2 wherein said gas tube cavities of one set are staggered lengthwise in relation to said gas tube cavities of the other set.

5. The gas tube terminal assembly of claim 2 including a surge-protector gas tube in each of said gas tube cavities; and each of said gas tubes having end terminals engaged by the associated ones of said contact portions, and an intermediate terminal engaged by the associated ones of said spring arms.

* * * * *